United States Patent
An et al.

(10) Patent No.: US 10,977,507 B2
(45) Date of Patent: Apr. 13, 2021

(54) DRIVER MONITORING APPARATUS AND METHOD

(71) Applicants: HYUNDAI MOTOR COMPANY, Seoul (KR); KIA MOTORS CORPORATION, Seoul (KR)

(72) Inventors: Dae Yun An, Anyang-si (KR); Gyun Ha Kim, Incheon (KR); Eung Hwan Kim, Seoul (KR); Sang Kyung Seo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/744,588

(22) Filed: Jan. 16, 2020

(65) Prior Publication Data

US 2021/0034890 A1 Feb. 4, 2021

(30) Foreign Application Priority Data

Jul. 29, 2019 (KR) .................. 10-2019-0091755

(51) Int. Cl.
| | | |
|---|---|---|
| *G06K 9/00* | (2006.01) | |
| *B60R 22/48* | (2006.01) | |
| *B60W 50/14* | (2020.01) | |
| *G08B 21/06* | (2006.01) | |

(52) U.S. Cl.
CPC .......... *G06K 9/00845* (2013.01); *B60R 22/48* (2013.01); *B60W 50/14* (2013.01); *G08B 21/06* (2013.01); *B60R 2022/4808* (2013.01); *B60W 2050/143* (2013.01)

(58) Field of Classification Search
USPC ........................................ 348/148
See application file for complete search history.

(56) References Cited

U.S. PATENT DOCUMENTS

| | | | | |
|---|---|---|---|---|
| 6,575,902 B1 * | 6/2003 | Burton | ..................... | A61B 5/18 600/300 |
| 10,247,768 B2 * | 4/2019 | Lee | ......................... | G01R 31/12 |
| 2002/0038573 A1 * | 4/2002 | Clark | ...................... | B60R 22/48 73/862.391 |
| 2004/0044293 A1 * | 3/2004 | Burton | ..................... | B60L 3/02 600/544 |
| 2007/0096447 A1 * | 5/2007 | Tabe | .................. | B60R 21/01516 280/735 |
| 2014/0276090 A1 * | 9/2014 | Breed | ................ | A61B 5/14546 600/473 |
| 2017/0215766 A1 * | 8/2017 | Fernandez Prada | ........................ | A61B 5/6814 |
| 2017/0274906 A1 * | 9/2017 | Hassan | .................. | B60K 28/14 |

(Continued)

FOREIGN PATENT DOCUMENTS

| | | | | |
|---|---|---|---|---|
| KR | 20180065663 | * | 6/2018 | ............. B60K 28/02 |
| KR | 2019-0044818 A | | 5/2019 | |

*Primary Examiner* — Behrooz M Senfi
(74) *Attorney, Agent, or Firm* — McDonnell Boehnen Hulbert & Berghoff LLP (57) ABSTRACT

The present disclosure relates to an apparatus and method for monitoring a driver. The apparatus includes one or more sensors that are embedded in a seat belt and that measure electrical resistances according to a movement of the driver, respectively, and a controller that estimates a posture of the driver, based on changes of the electrical resistances measured by the sensors.

18 Claims, 5 Drawing Sheets

(56) References Cited

U.S. PATENT DOCUMENTS

2019/0147262 A1* 5/2019 Kuehnle ................ G07C 5/008
 340/439
2019/0147263 A1* 5/2019 Kuehnle .............. G07C 5/0866
 340/439

* cited by examiner

DRIVER MONITORING APPARATUS AND METHOD

CROSS-REFERENCE TO RELATED APPLICATION

This application claims the benefit of priority to Korean Patent Application No. 10-2019-0091755, filed in the Korean Intellectual Property Office on Jul. 29, 2019, the entire contents of which are incorporated herein by reference.

TECHNICAL FIELD

The present disclosure relates to a driver monitoring apparatus and method.

BACKGROUND

A Driver Monitoring System (DMS) is an apparatus that warns a driver when the driver does not pay attention to a road ahead or dozes off while driving. The driver monitoring system uses a driving pattern or an in-vehicle camera to determine the driver's fatigue and/or careless driving. However, the driving pattern is an indirect estimation method, and the camera is affected by an environmental condition such as disturbance light and/or a driving posture. Therefore, an error may occur in the determination of the driver's fatigue and/or careless driving.

SUMMARY

The present disclosure has been made to solve the above-mentioned problems occurring in the prior art while advantages achieved by the prior art are maintained intact.

An aspect of the present disclosure provides a driver monitoring apparatus and method for estimating a driver's state and posture by detecting a movement of the driver through stretch sensors embedded in a seat belt.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for monitoring a driver includes one or more sensors that are embedded in a seat belt and that measure electrical resistances according to a movement of the driver, respectively, and a controller that estimates a posture of the driver, based on changes of the electrical resistances measured by the sensors.

The sensors may be implemented with a stretch sensor.

The sensors may include a first sensor mounted at a first point of the seat belt that supports a shoulder of the driver, a second sensor mounted at a second point of the seat belt that supports a waist of the driver, and a third sensor mounted at a third point of the seat belt that supports the waist of the driver and is opposite to the second point.

The controller may measure and store first initial electrical resistance, second initial electrical resistance, and third initial electrical resistance through the first sensor, the second sensor, and the third sensor when a vehicle starts to travel.

The controller may determine "no posture change" when changes of first electrical resistance, second electrical resistance, and third electrical resistance with respect to the first initial electrical resistance, the second initial electrical resistance, and the third initial electrical resistance are less than or equal to a first reference resistance, in which the first electrical resistance, the second electrical resistance, and the third electrical resistance are measured by the first sensor, the second sensor, and the third sensor, respectively.

The controller may determine an "unstable lumbar-spine posture" when changes of second electrical resistance and third electrical resistance with respect to the second initial electrical resistance and the third initial electrical resistance are greater than or equal to a second reference resistance and a change of first electrical resistance with respect to the first initial electrical resistance is less than or equal to a third reference resistance, in which the first electrical resistance, the second electrical resistance, and the third electrical resistance are measured by the first sensor, the second sensor, and the third sensor, respectively.

The controller may determine an "unstable cervical-spine posture" when the change of the first electrical resistance, which is measured by the first sensor, with respect to the first initial electrical resistance is greater than or equal to the second reference resistance and the changes of the second electrical resistance and the third electrical resistance, which are measured by the second sensor and the third sensor, with respect to the second initial electrical resistance and the third initial electrical resistance are less than or equal to the third reference resistance.

The controller may provide feedback to the driver in conjunction with an in-vehicle device according to the posture of the driver.

The in-vehicle device may include one or more of a cluster, a seat control device, an AVN, and a seat belt control device.

The apparatus may further include a camera that is mounted in a vehicle and that obtains an image of the driver. The controller may determine whether eyes of the driver are closed, by analyzing the image obtained by the camera and may determine a drowsy state of the driver, based on whether the eyes of the driver are closed and the posture of the driver.

According to another aspect of the present disclosure, a method for monitoring a driver includes measuring electrical resistances through one or more sensors during travel of a vehicle, the one or more sensors being embedded in a seat belt and estimating a posture of the driver, based on changes of the electrical resistances measured by the one or more sensors.

The method may further include, prior to the measuring of the electrical resistances, measuring and storing first initial electrical resistance, second initial electrical resistance, and third initial electrical resistance through a first sensor, a second sensor, and a third sensor when the vehicle starts to travel, in which the first sensor is mounted at a first support point of the seat belt that supports a shoulder of the driver, and the second sensor and the third sensor are mounted at a second support point and a third support point of the seat belt that support a waist of the driver.

The estimating of the posture of the driver may include calculating changes of first electrical resistance, second electrical resistance, and third electrical resistance, based on the first initial electrical resistance, the second initial electrical resistance, and the third initial electrical resistance, in which the first electrical resistance, the second electrical resistance, and the third electrical resistance are measured by the first sensor, the second sensor, and the third sensor and determining the posture of the driver, based on the changes of the first electrical resistance, the second electrical resistance, and the third electrical resistance.

The determining of the posture of the driver may include determining "no posture change" when the changes of the first electrical resistance, the second electrical resistance, and the third electrical resistance, which are measured by the first sensor, the second sensor, and the third sensor, with respect to the first initial electrical resistance, the second initial electrical resistance, and the third initial electrical resistance are less than or equal to a first reference resistance.

The determining of the posture of the driver may further include determining an "unstable lumbar-spine posture" when the changes of the second electrical resistance and the third electrical resistance, which are measured by the second sensor and the third sensor, with respect to the second initial electrical resistance and the third initial electrical resistance are greater than or equal to a second reference resistance and the change of the first electrical resistance, which is measured by the first sensor, with respect to the first initial electrical resistance is less than or equal to a third reference resistance.

The determining of the posture of the driver may further include determining an "unstable cervical-spine posture" when the change of the first electrical resistance, which is measured by the first sensor, with respect to the first initial electrical resistance is greater than or equal to the second reference resistance and the changes of the second electrical resistance and the third electrical resistance, which are measured by the second sensor and the third sensor, with respect to the second initial electrical resistance and the third initial electrical resistance are less than or equal to the third reference resistance.

The method may further include providing feedback to the driver in conjunction with an in-vehicle device according to the posture of the driver after the estimating of the posture of the driver.

The feedback may include information for inducing the driver to take a rest or correct the posture.

In the measuring of the electrical resistances, an image of the driver may be obtained through a camera mounted in the vehicle.

In the estimating of the posture of the driver, whether eyes of the driver are closed may be determined by analyzing the image obtained by the camera, and a drowsy state of the driver may be determined based on whether the eyes of the driver are closed and the posture of the driver.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to a technology for measuring a driver's drowsiness or posture change in a way of directly measuring a movement of the driver through stretch sensors imbedded in a seat belt, that is, a safety belt.

Figure 1:
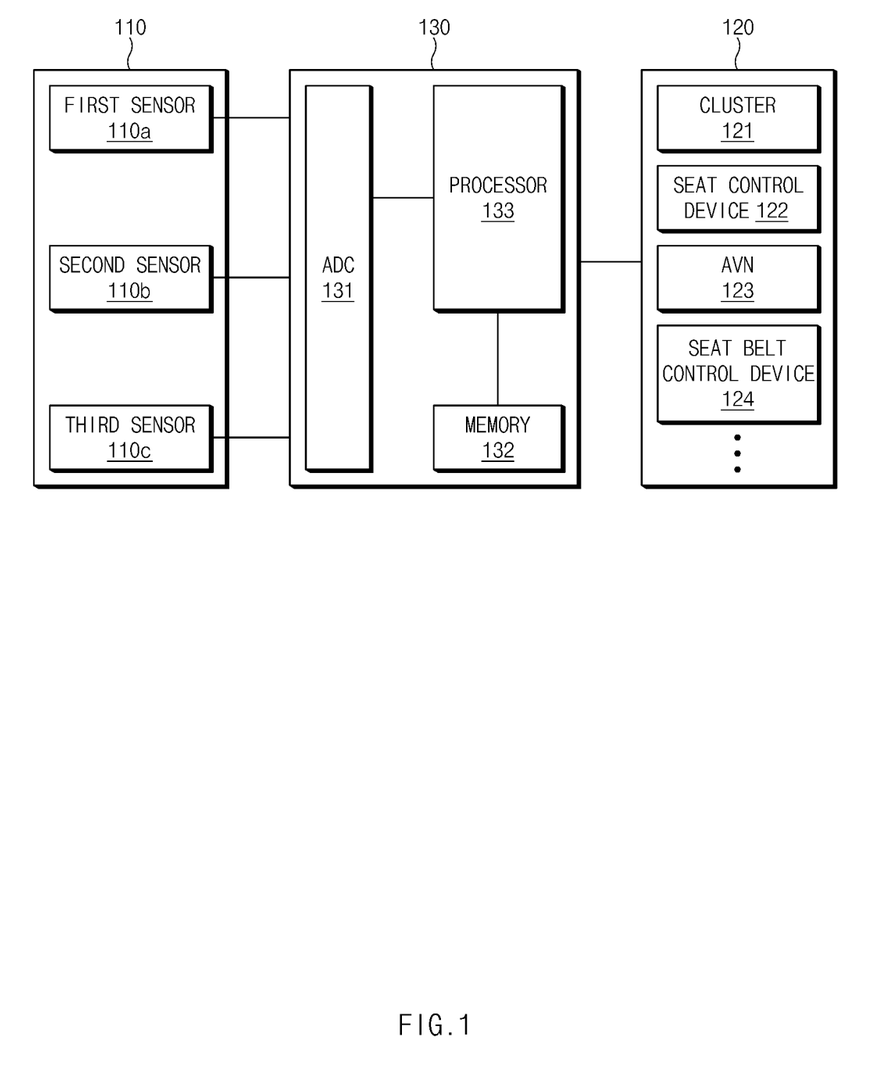
FIG. 1 is a block diagram illustrating a configuration of a driver monitoring apparatus according to an embodiment of the present disclosure.

FIG. 1 is a block diagram illustrating a configuration of a driver monitoring apparatus according to an embodiment of the present disclosure.

Referring to FIG. 1, the driver monitoring apparatus includes sensors 110 (110a, 110b, and 110c), in-vehicle devices 120, and a controller 130, which are connected via an In-Vehicle Network (IVN). The IVN is implemented with a Controller Area Network (CAN), a Media Oriented Systems Transport (MOST) network, a Local Interconnect Network (LIN), X-by-Wire (Flexray), or the like.

The sensors 110 are embedded in a seat belt and measure strains (or displacements), that is, electrical resistances according to a movement of a user (e.g., a driver and/or an occupant). The sensors 110 may be implemented with a thin film based on a composite material of a conductive nano-material and a rubber material. When the thin film is stretched by external tension according to the movement of the user, the sensors 110 output electrical resistances depending on the degree to which the thin film is stretched. Stretch sensors that measure deformation and stretching forces may be used as the sensors 110. The seat belt is primarily affected by the sensors 110 according to the movement of the driver and acts as a safety belt when a large force above a threshold acts.

Figure 2:
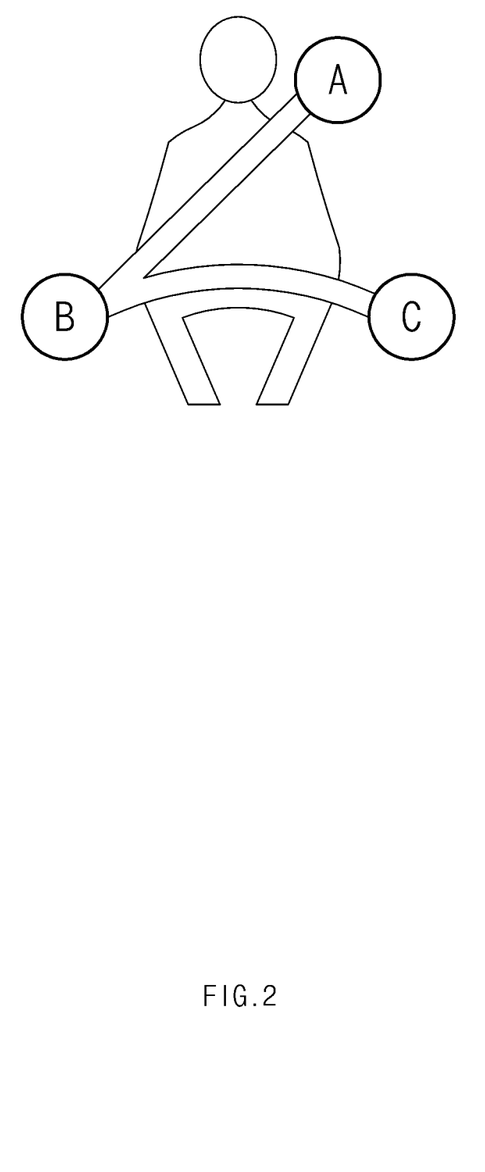
FIG. 2 is a view illustrating arrangement of stretch sensors according to an embodiment of the present disclosure.

The sensors 110 are mounted at support points (fixed points) of the seat belt. For example, when a three-point seat belt is mounted in a vehicle, the sensors 110, as illustrated in FIG. 2, are installed at points A, B, and C where support points of the seat belt are located. In other words, the first sensor 110a is installed at the point A that supports the driver's shoulder, and the second sensor 110b and the third sensor 110c are installed at the points B and C that support the driver's waist. In this embodiment, it is exemplified that the sensors 110 are disposed at the three support points of the three-point seat belt. However, without being limited thereto, the sensors 110 may be disposed at five support points in the case where a five-point seat belt is applied to the vehicle, or may be disposed at six support points in the case where a six-point seat belt is applied to the vehicle.

The in-vehicle devices 120 may be electronic devices that are mounted in the vehicle and that perform predetermined functions. The in-vehicle devices 120 may include a cluster 121, a seat control device 122, an Audio Video Navigation (AVN) 123, and a seat belt control device 124.

The cluster 121 serves to display a driving state of the vehicle and information regarding operations of various devices in the vehicle. When displaying the information, the cluster 121 may output the information in the form of text and/or an image. For example, the cluster 121 outputs rest recommendation and/or posture change recommendation as visual information such as a message and/or an image.

The seat control device 122 operates a massage function (a vibration function), a back support, a lumbar support, and/or an air cushion. The seat control device 122 may adjust a movement of the back support, the lumbar support, and/or the air cushion of the seat. Furthermore, the seat control device 122 may blow wind to the cushion and/or the back support of the seat.

The AVN 123 outputs rest recommendation, posture change recommendation, a posture correction guide, and/or a correct posture guide in the form of visual information and/or auditory information. The AVN 123 may display visual information on a display and may output auditory information through a speaker.

The seat belt control device 124 may gradually pull the seat belt to allow the driver to correct his/her posture and recognize postural instability by himself/herself. Furthermore, the seat belt control device 124 may apply vibration to the seat belt to allow the driver to recognize postural instability.

The controller 130 may estimate the driver's state and/or posture, based on changes of electrical resistances measured by the sensors 110. Here, the driver's state refers to a weary state and/or a drowsy state of the driver. For example, when there are no changes of the electrical resistances until predetermined time elapses, the controller 130 may determine that the driver needs a rest. Alternatively, when the electrical resistances slowly change, the controller 130 may determine that the driver is in a weary state. In another case, when the electrical resistances consistently change, the controller 130 may determine an unstable posture. The controller 130 may provide feedback to the driver in conjunction with the in-vehicle devices 120 according to the driver's state and/or posture. The controller 130 includes an Analog Digital Converter (ADC) 131, a memory 132, and a processor 133.

The ADC 131 is a converter that converts an analog signal to a digital signal. The ADC 131 receives sensing signals output from the sensors 110 and converts the sensing signals to digital data, that is, electrical resistances.

The memory 132 may store software programmed to cause the processor 133 to perform a predetermined operation. The memory 132 may store setting information such as a first reference resistance $R_1$, a second reference resistance $R_2$, and a third reference resistance $R_3$ ($R_1 < R_3 < R_2$). Furthermore, the memory 132 may store a lookup table in which feedback depending on the driver's state and/or posture is defined. For example, the lookup table may be implemented as shown in Table 1.

TABLE 1

|  | No posture change | Unstable lumbar-spine posture | Unstable cervical-spine posture |
| --- | --- | --- | --- |
| Cluster | Inform of posture change recommendation | Inform of need for posture correction | Inform of need for posture correction |
| Seat | Fine-tune movement of seat | Adjust lumbar support | — |
| AVN | — | Output correct posture guide | Output correct posture guide |
| Seat belt | Vibrate seat belt | Pull seat belt (Correct posture) | Pull seat belt (Correct posture) |

Furthermore, the memory 132 may store a driver state analysis algorithm. The memory 132 may be implemented with at least storage medium (recording medium) among storage media such a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a removable disk, and the like. The processor 133 controls an overall operation of the controller 130. The processor 133 may be implemented with at least one of an Application Specific Integrated Circuit (ASIC), a Digital Signal Processor (DSP), Programmable Logic Devices (PLDs), Field Programmable Gate Arrays (FPGAs), a Central Processing Unit (CPU), microcontrollers, and microprocessors.

When the vehicle starts to travel, the processor 133 obtains first initial electrical resistance, second initial electrical resistance, and third initial electrical resistance through the first sensor 110a, the second sensor 110b, and the third sensor 110c and stores the first to third initial electrical resistances in the memory 132.

During the travel of the vehicle, the processor 133 collects first electrical resistance, second electrical resistance, and third electrical resistance that are measured through the first sensor 110a, the second sensor 110b, and the third sensor 110c according to a predetermined period. The processor 133 may calculate variations (changes) of the first electrical resistance, the second electrical resistance, and the third electrical resistance, based on the first initial electrical resistance, the second initial electrical resistance, and the third initial electrical resistance. For example, the processor 133 may calculate the variation of the first electrical resistance with respect to the first initial electrical resistance by subtracting the first initial electrical resistance from the first electrical resistance. The processor 133 may calculate the variations of the second electrical resistance and the third electrical resistance in the way of calculating the variation of the first electrical resistance.

The processor 133 may estimate the driver's state and posture, based on the changes of the first electrical resistance, the second electrical resistance, and the third electrical resistance. The processor 133 determines the driver's state and posture when the changes of the first electrical resistance, the second electrical resistance, and the third electrical resistance are maintained for a predetermined period of time (e.g., 30 minutes or 10 minutes) or more. Here, the predetermined period of time may be changed and set by a system designer or the user.

The driver's posture may be classified as "no posture change," an "unstable lumbar-spine posture," or an "unstable cervical-spine posture." "No posture change" refers to a state of maintaining the same posture, and when the driver drives the vehicle for a long time without a posture change, loads acting on the cervical spine and the lumbar spine increase to raise the driver's fatigue. The "unstable lumbar-spine posture" refers to a posture in which due to a long period of driving, the hips move forward and the center of gravity of the body is changed, resulting in an increase in the load acting on the lumbar spine. The "unstable cervical-spine posture" is a turtle neck posture in which a large load is applied to the cervical spine and the shoulders, and when the driver drives the vehicle in the corresponding posture, the fatigue of the driver is raised.

When the changes of the first electrical resistance, the second electrical resistance, and the third electrical resistance are less than or equal to the first reference resistance $R_1$ (e.g., 125Ω), the processor 133 determines (decides) the driver's posture to be "no posture change." When the driver's posture is determined to be "no posture change," the processor 133 may determine that the driver needs to change the posture.

The processor 133 determines the driver's posture to be the "unstable lumbar-spine posture" when the second and third electrical resistances, which are measured through the second and third sensors 110b and 110c, are gradually changed for reference time (e.g., 10 minutes), but increased to be greater than the second and third initial electrical resistances and the variation of the first electrical resistance, which is measured by the first sensor 110a, with respect to the first initial electrical resistance is small. In other words, the processor 133 determines the driver's posture to be the "unstable lumbar-spine posture" when the changes (variations) of the second electrical resistance and the third electrical resistance measured by the second sensor 110b and the third sensor 110c are greater than or equal to the second reference resistance $R_2$ and the change of the first electrical resistance measured by the first sensor 110a is less than or equal to the third reference resistance $R_3$.

The processor 133 determines the driver's posture to be the "unstable cervical-spine posture" when the change of the first electrical resistance measured by the first sensor 110a is greater than or equal to the second reference resistance $R_2$ and the changes of the second electrical resistance and the third electrical resistance measured by the second sensor 110b and the third sensor 110c are less than or equal to the third reference resistance $R_3$.

When the driver's posture is determined, the processor 133 provides feedback to the driver in conjunction with the in-vehicle devices 120 according to the driver's posture. The feedback may be provided in the form of visual information, auditory information, and tactile information.

More specifically, when it is determined that the driver needs to change the posture, the processor 133 may provide notification for proposing a rest to the driver in conjunction with the in-vehicle devices 120. For example, the processor 133 may output a message such as "Please, take a rest for a while" and/or an image on the cluster 121. Furthermore, the processor 133 may induce the driver to change his/her posture, by fine-tuning a movement of the back support, the lumbar support, and/or the air cushion of the seat in conjunction with the seat control device 122. The processor 133 may allow the driver to recognize the need for a posture change, by applying vibration to the seat belt in conjunction with the seat belt control device 124. The processor 133 may play and output a stretching image through the AVN 123, or may operate a massage (vibration) function of the seat through the seat control device 122. Furthermore, the processor 133 may ventilate the vehicle in conjunction with an air-conditioning apparatus, or may play radio in conjunction with a media playback device (not illustrated).

When the driver's posture is determined to be the "unstable lumbar-spine posture," the processor 133 may output a message and/or an image on the cluster 121 and/or the AVN 123 to inform of the need for posture correction. For example, the processor 133 may output a message such as "Your posture is unstable." Furthermore, the processor 133 may allow the lumbar support to support the driver's lumbar spine, by moving the lumbar support forward in conjunction with the seat control device 122. Moreover, the processor 133 may output a correct posture guide through the AVN 123. The AVN 123 may play and display a correct posture guide image on the display and may output a guide sound together through the speaker. The processor 133 may gradually pull the seat belt in conjunction with the seat belt control device 124 to allow the driver to correct the posture and recognize the postural instability by himself/herself.

When the driver's posture is determined to be the "unstable cervical-spine posture," the processor 133 may output notification on the cluster 121 and/or the AVN 123 to inform of the need for posture correction. Furthermore, the processor 133 may output a turtle neck correction guide and/or a correct posture guide through the AVN 123. The processor 133 may allow the driver to correct the posture, by gradually pulling the seat belt in conjunction with the seat belt control device 124.

Figure 3:
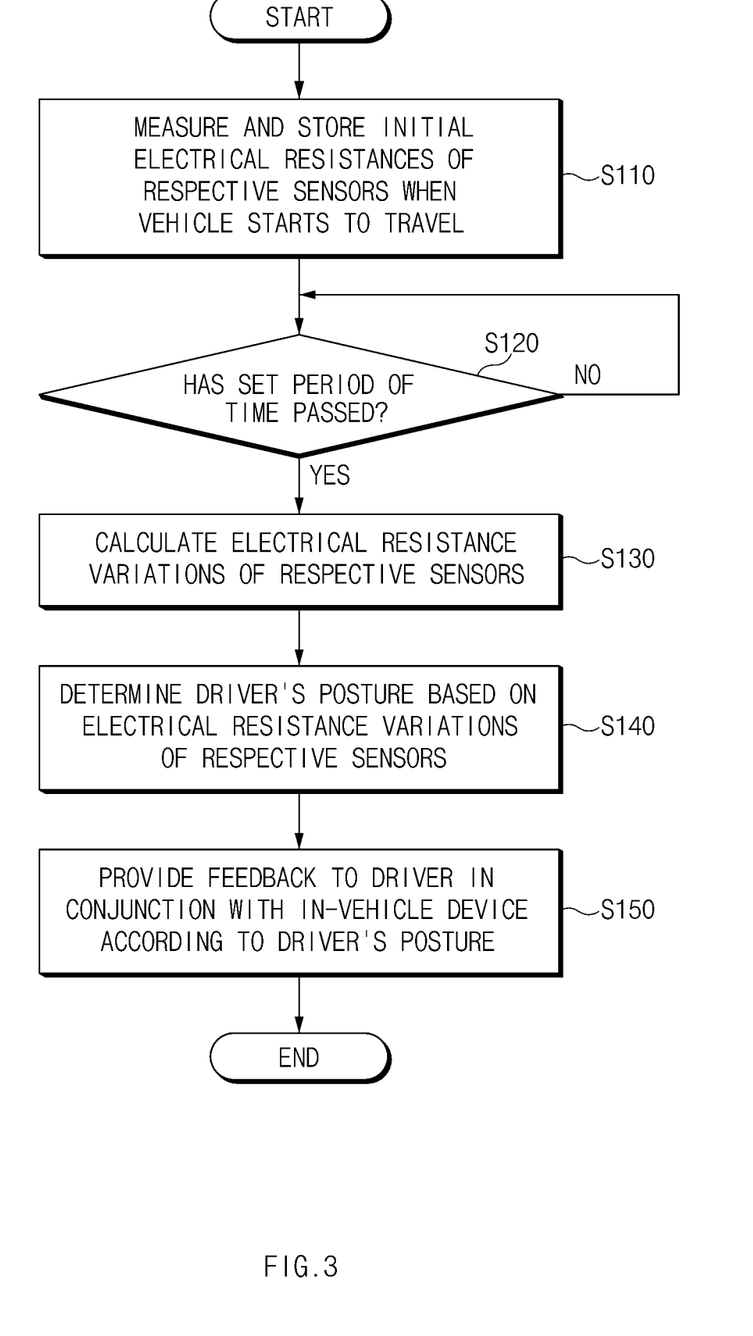
FIG. 3 is a flowchart illustrating a driver monitoring method according to an embodiment of the present disclosure.
Figure 4:
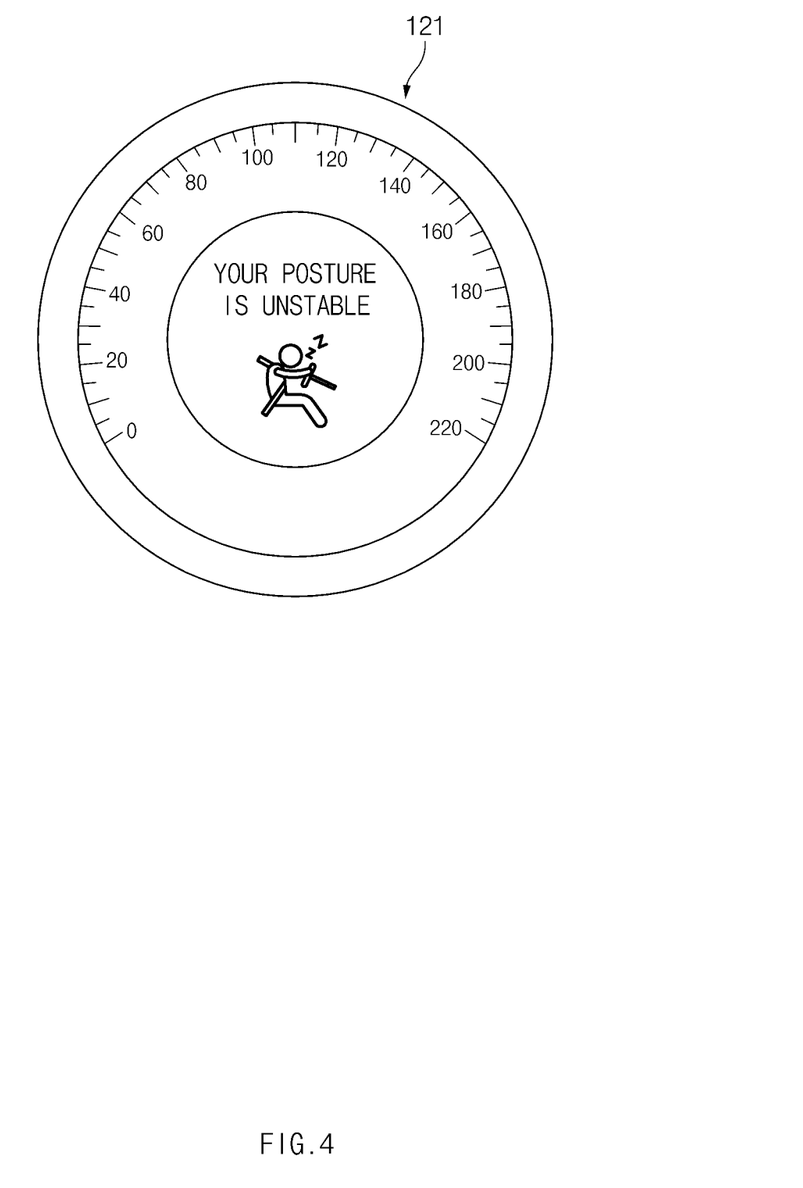
FIG. 4 illustrates an example of outputting feedback depending on a driver monitoring result according to an embodiment of the present disclosure.

FIG. 3 is a flowchart illustrating a driver monitoring method according to an embodiment of the present disclosure, and FIG. 4 illustrates an example of outputting feedback depending on a driver monitoring result according to an embodiment of the present disclosure.

When the vehicle starts to travel, the controller 130 measures and stores initial electrical resistances of the respective sensors (S110). The controller 130 measures the initial electrical resistances (first initial electrical resistance, second initial electrical resistance, and third initial electrical resistance) through the first sensor 110a, the second sensor 110b, and the third sensor 110c that are mounted at the support points of the seat belt. The controller 130 stores the measured initial electrical resistances in the memory 132.

When a set period of time elapses (S120), the controller 130 calculates changes of electrical resistances of the respective sensors (S130). The controller 130 measures the electrical resistances, that is, first electrical resistance, second electrical resistance, and third electrical resistance of the sensors by using the first sensor 110a, the second sensor 110b, and the third sensor 110c and calculates the changes of the electrical resistances of the sensors with respect to the initial electrical resistances of the sensors. In other words, the controller 130 calculates the variation of the first electrical resistance, that is, the change of the electrical resistance of the first sensor 110a by subtracting the first initial electrical resistance from the first electrical resistance measured by the first sensor 110a. The controller 130 may calculate the variations of the second and third electrical resistances by subtracting the second and third initial electrical resistances from the second and third electrical resistances measured by the second and third sensors 110b and 110c.

The controller 130 determines the driver's posture, based on the changes of the electrical resistances of the respective sensors (S140). The controller 130 determines the driver's posture to be "no posture change," when the state in which the first electrical resistance variation, the second electrical resistance variation, and the third electrical resistance variation are less than or equal to the first reference resistance $R_1$ is maintained for a preset period of time. The controller 130 determines the driver's posture to be an "unstable lumbar-spine posture," when the state in which the second electrical resistance variation and the third electrical resistance variation are greater than or equal to the second reference resistance and the first electrical resistance variation is less than or equal to the third reference resistance is maintained for the preset period of time. The controller 130 determines the driver's posture to be an "unstable cervical-spine posture," when the state in which the first electrical resistance variation is greater than or equal to the second reference resistance and the second electrical resistance variation and the third electrical resistance variation are less than or equal to the third reference resistance is maintained for the preset period of time. The preset period of time may be changed by the system designer or the driver (that is, the user).

The controller 130 provides feedback to the driver in conjunction with the in-vehicle devices 120 according to the driver's posture (S150). The controller 130 may output the feedback using at least one of the cluster 121, the seat control device 122, the AVN 123, and the seat belt control device 124. The controller 130 may output a message and/or an image through the cluster 121 and/or the AVN 123 to inform of a need for posture change, a need for posture correction, or a need for rest. For example, as illustrated in FIG. 4, the cluster 121 may output a message such as "Your posture is unstable" and an image such as an emoticon under the control of the controller 130. Furthermore, the controller 130 may correct the driver's posture by adjusting a movement of the back support, the lumbar support, and/or the air cushion of the seat in conjunction with the seat control device 122. The controller 130 may correct the driver's posture by applying vibration to the seat belt, or gradually pulling the seat belt such that the seat belt is brought into close contact with the driver, in conjunction with the seat belt control device 124.

Figure 5:
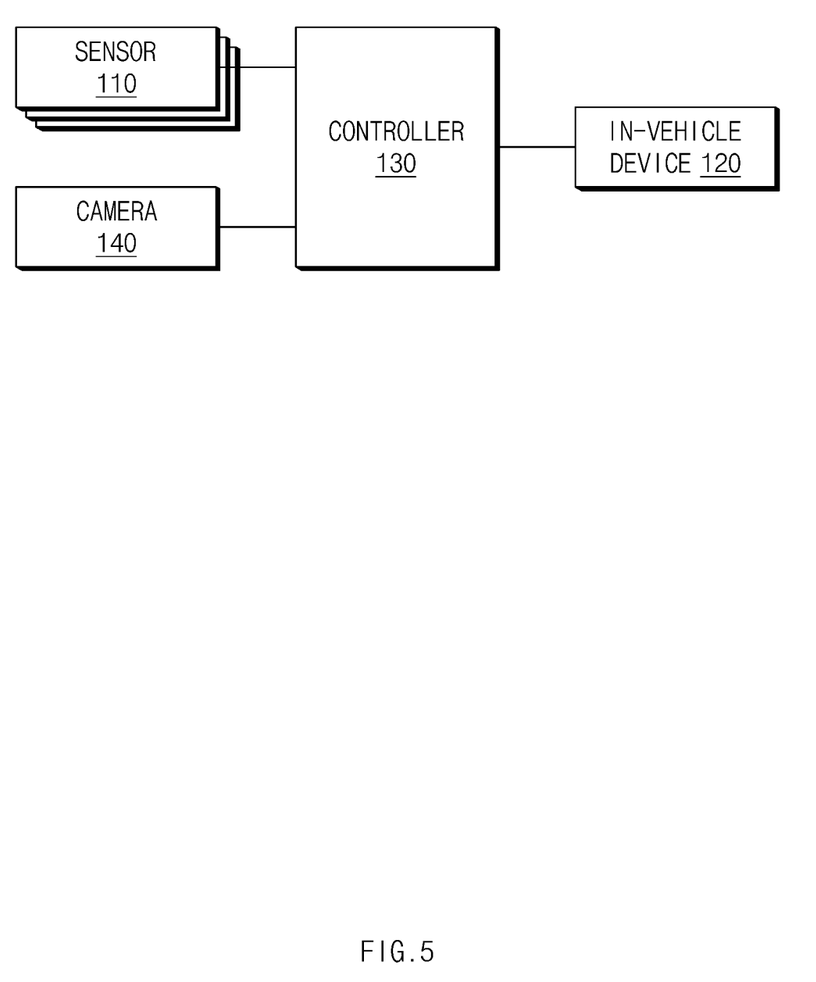
FIG. 5 is a block diagram illustrating a configuration of a driver monitoring apparatus according to another embodiment of the present disclosure.

FIG. 5 is a block diagram illustrating a configuration of a driver monitoring apparatus according to another embodiment of the present disclosure. The following description is focused on the difference from the driver monitoring apparatus illustrated in FIG. 1. Referring to FIG. 5, the driver monitoring apparatus includes sensors 110, in-vehicle devices 120, a controller 130, and a camera 140.

The sensors 110 are mounted at support points of a seat belt and output electrical resistances according to a movement of a driver (that is, a user). The sensors 110 may be implemented with a stretch sensor. The electrical resistances measured by the sensors 110 are used to determine the driver's posture.

The in-vehicle devices 120 output feedback based on a driver monitoring result, that is, the driver's state and/or posture. The in-vehicle devices 120 may include a cluster 121, a seat control device 122, an AVN 123, and/or a seat belt control device 124.

The controller 130 monitors the driver through the sensors 110 and the camera 140 and provides feedback to the driver in conjunction with the in-vehicle devices 120, based on the monitoring result. The controller 130 may include an ADC 131, a memory 132, and a processor 133.

The camera 140 obtains an image of the driver during travel of a vehicle. The camera 140 may be disposed on the cluster 121, a C/PAD (CRASH PAD), or an A-pillar. The camera 140 may be implemented with at least one image sensor among image sensors such as a Charge Coupled Device (CCD) image sensor, a Complementary Metal Oxide Semiconductor (CMOS) image sensor, a Charge Priming Device (CPD) image sensor, and a Charge Injection Device (CID) image sensor. The camera 140 may include an image processor that performs image processing, such as noise removal, color reproduction, file compression, image quality adjustment, and color saturation adjustment, on an image obtained through an image sensor.

The controller 130 analyzes the image of the driver obtained by the camera 140 and determines a state of the driver. The controller 130 processes the image of the driver, which is received from the camera 140, by using an image processing algorithm stored in the memory 132. The controller 130 determines whether the driver's eyes are closed, based on the image of the driver by using a driver state determination algorithm stored in the memory 132. The controller 130 determines whether the driver is in a drowsy state, based on whether the driver's eyes are closed and the driver's posture. The controller 130 determines the driver's state to be a drowsy state, when there is no posture change in the state in which the driver's eyes are closed.

When it is determined that the driver is in a drowsy state, the controller 130 provides feedback to the driver in conjunction with the in-vehicle devices 120. The controller 130 may output a message and/or an image to recommend a rest to the driver, through the cluster 121 and/or the AVN 123. Furthermore, the controller 130 may provide feedback to the driver by adjusting a movement of a cushion, a back support, and/or a lumbar support of a seat in conjunction with the seat control device 122. The controller 130 may provide feedback to the driver by blowing wind to the seat through the seat control device 122. Moreover, the controller 130 may allow the driver to recognize the drowsy state, by applying vibration to the seat belt, or pulling the seat belt, through the seat belt control device 124.

As described above, the driver monitoring apparatus according to this embodiment recognizes a state of the driver's eyes through the camera 140, recognizes a change in movement of the driver by using the sensors 110, and determines whether the driver is in a drowsy state, in view of the state of the driver's eyes and the change in movement, thereby improving the accuracy in determining whether the driver is in the drowsy state.

According to the above-described embodiments, the driver monitoring apparatuses provide feedback to the driver in conjunction with the in-vehicle functions, based on the driver's state and/or posture, thereby preventing the driver from dozing off at the wheel and preventing pains caused by loads that are applied to a specific part of the driver's body when the driver drives the vehicle for a long period of time and/or drives the vehicle in an incorrect posture.

According to the present disclosure, the driver monitoring apparatus and method estimates a driver's state and posture by detecting a movement of the driver through stretch sensors embedded in a seat belt. Accordingly, the driver monitoring apparatus and method does not require a separate mechanism or apparatus for detecting the movement of the driver and may thus be implemented at a low cost.

Furthermore, according to the present disclosure, the driver monitoring apparatus and method directly detects the movement of the driver through the stretch sensors. Accordingly, the driver monitoring apparatus and method is not affected by environmental factors such as external light, vibration, sound, and the like.

In addition, according to the present disclosure, the driver monitoring apparatus and method provides feedback in conjunction with the in-vehicle functions, based on the driver's state and posture. Accordingly, the driver monitoring apparatus and method may prevent drowsy driving and/or lumbar pains, thereby ensuring the driver's safety and health.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. An apparatus for monitoring a driver, the apparatus comprising:
a plurality of stretch sensors embedded in a seat belt, the sensors being configured to measure electrical resistances according to a movement of the driver, respectively; and
a controller configured to estimate a posture of the driver, based on changes of the electrical resistances measured by the plurality of sensors;
wherein the plurality of stretch sensors include:
a first stretch sensor mounted at a first point of the seat belt that supports a shoulder of the driver;
a second stretch sensor mounted at a second point of the seat belt that supports a waist of the driver; and
a third stretch sensor mounted at a third point of the seat belt that supports the waist of the driver and is opposite to the second point.

2. The apparatus of claim 1, wherein the controller measures and stores first initial electrical resistance, second initial electrical resistance, and third initial electrical resistance through the first sensor, the second sensor, and the third sensor when a vehicle starts to travel.

3. The apparatus of claim 2, wherein the controller determines no posture change when changes of first electrical resistance, second electrical resistance, and third electrical resistance with respect to the first initial electrical resistance, the second initial electrical resistance, and the third initial electrical resistance are less than or equal to a first reference resistance, wherein the first electrical resistance, the second electrical resistance, and the third electrical resistance are measured by the first sensor, the second sensor, and the third sensor, respectively.

4. The apparatus of claim 2, wherein the controller determines an unstable lumbar-spine posture when changes of second electrical resistance and third electrical resistance with respect to the second initial electrical resistance and the third initial electrical resistance are greater than or equal to a second reference resistance and a change of first electrical resistance with respect to the first initial electrical resistance is less than or equal to a third reference resistance, wherein the first electrical resistance, the second electrical resistance, and the third electrical resistance are measured by the first sensor, the second sensor, and the third sensor, respectively.

5. The apparatus of claim 4, wherein the controller determines an unstable cervical-spine posture when the change of the first electrical resistance, which is measured by the first sensor, with respect to the first initial electrical resistance is greater than or equal to the second reference resistance and the changes of the second electrical resistance and the third electrical resistance, which are measured by the second sensor and the third sensor, with respect to the second initial electrical resistance and the third initial electrical resistance are less than or equal to the third reference resistance.

6. The apparatus of claim 1, wherein the controller provides feedback to the driver in conjunction with an in-vehicle device according to the posture of the driver.

7. The apparatus of claim 6, wherein the in-vehicle device includes one or more of a cluster, a seat control device, an audio video navigation (AVN), and a seat belt control device.

8. The apparatus of claim 1, further comprising:
a camera mounted in a vehicle and configured to obtain an image of the driver,
wherein the controller determines whether eyes of the driver are closed, by analyzing the image obtained by the camera and determines a drowsy state of the driver, based on whether the eyes of the driver are closed and the posture of the driver.

9. A method for monitoring a driver, the method comprising:
measuring electrical resistances through a plurality of stretch sensors during travel of a vehicle, the one or more plurality of stretch sensors being embedded in a seat belt; and
estimating a posture of the driver, based on changes of the electrical resistances measured by the plurality of stretch sensors;
wherein the plurality of stretch sensors include:
a first stretch sensor mounted at a first point of the seat belt that supports a shoulder of the driver;
a second stretch sensor mounted at a second point of the seat belt that supports a waist of the driver; and
a third stretch sensor mounted at a third point of the seat belt that supports the waist of the driver and is opposite to the second point.

10. The method of claim 9, further comprising:
prior to the measuring of the electrical resistances, measuring and storing first initial electrical resistance, second initial electrical resistance, and third initial electrical resistance through the first stretch sensor, the second stretch sensor, and the third stretch sensor when the vehicle starts to travel.

11. The method of claim 10, wherein the estimating of the posture of the driver includes:
calculating changes of first electrical resistance, second electrical resistance, and third electrical resistance, based on the first initial electrical resistance, the second initial electrical resistance, and the third initial electrical resistance, wherein the first electrical resistance, the second electrical resistance, and the third electrical resistance are measured by the first sensor, the second sensor, and the third sensor; and
determining the posture of the driver, based on the changes of the first electrical resistance, the second electrical resistance, and the third electrical resistance.

12. The method of claim 11, wherein the determining of the posture of the driver includes:
determining no posture change when the changes of the first electrical resistance, the second electrical resistance, and the third electrical resistance, which are measured by the first sensor, the second sensor, and the third sensor, with respect to the first initial electrical resistance, the second initial electrical resistance, and the third initial electrical resistance are less than or equal to a first reference resistance.

13. The method of claim 12, wherein the determining of the posture of the driver further includes:
determining an unstable lumbar-spine posture when the changes of the second electrical resistance and the third electrical resistance, which are measured by the second sensor and the third sensor, with respect to the second initial electrical resistance and the third initial electrical resistance are greater than or equal to a second reference resistance and the change of the first electrical resistance, which is measured by the first sensor, with respect to the first initial electrical resistance is less than or equal to a third reference resistance.

14. The method of claim 13, wherein the determining of the posture of the driver further includes:
determining an unstable cervical-spine posture when the change of the first electrical resistance, which is measured by the first sensor, with respect to the first initial electrical resistance is greater than or equal to the second reference resistance and the changes of the second electrical resistance and the third electrical resistance, which are measured by the second sensor and the third sensor, with respect to the second initial electrical resistance and the third initial electrical resistance are less than or equal to the third reference resistance.

15. The method of claim 9, further comprising:
providing feedback to the driver in conjunction with an in-vehicle device according to the posture of the driver after the estimating of the posture of the driver.

16. The method of claim 15, wherein the feedback includes information for inducing the driver to take a rest or correct the posture.

17. The method of claim 9, wherein in the measuring of the electrical resistances, an image of the driver is obtained through a camera mounted in the vehicle.

18. The method of claim 17, wherein in the estimating of the posture of the driver, whether eyes of the driver are closed is determined by analyzing the image obtained by the camera, and a drowsy state of the driver is determined based on whether the eyes of the driver are closed and the posture of the driver.

* * * * *